United States Patent [19]
De Bernardi et al.

[11] Patent Number: 5,263,036
[45] Date of Patent: Nov. 16, 1993

[54] PUMP SYSTEM FOR WAVEGUIDE LASERS OR AMPLIFIERS

[75] Inventors: Carlo De Bernardi, Turin; Salvatore Morasca, Como, both of Italy

[73] Assignee: Cselt-Centro Studi E Laboratori Telecomunicazioni S.p.A., Turin, Italy

[21] Appl. No.: 822,412

[22] Filed: Jan. 17, 1992

[30] Foreign Application Priority Data

Jan. 30, 1991 [IT] Italy ............................... 91 A 000060

[51] Int. Cl.$^5$ ................................................ H01S 3/30
[52] U.S. Cl. .......................................... 372/6; 385/127
[58] Field of Search ........................ 372/6; 385/49, 127, 385/126, 1, 2, 8, 27, 28, 31, 123, 129, 130

[56] References Cited

U.S. PATENT DOCUMENTS 4,815,079  3/1989  Snitzer et al. ............................ 372/6
4,829,529  5/1989  Kafka ................................... 385/127

FOREIGN PATENT DOCUMENTS 2239983  7/1991  United Kingdom .................... 372/6

OTHER PUBLICATIONS

The "Radiance Law" in Radiation Transfer Processes, Applied Physics No. 7 (1975) pp. 249-255, P. Di Vita and R. Vannucci.
Review of Rare Earth Doped Fibre Lasers and Amplifiers, by P. Urquhar IEE Proceedings, vol. 135, Part J. No. 6 Dec. 1988.

Primary Examiner—Georgia Y. Epps
Attorney, Agent, or Firm—Herbert Dubno

[57] ABSTRACT

A pump system for lasers or amplifiers made of a waveguide presenting a monomode active region, in which the pump radiation is launched into a multimode guide surrounding the active region. The radiation is obtained as a sum of the radiations emitted by a plurality of independent sources.

8 Claims, 2 Drawing Sheets

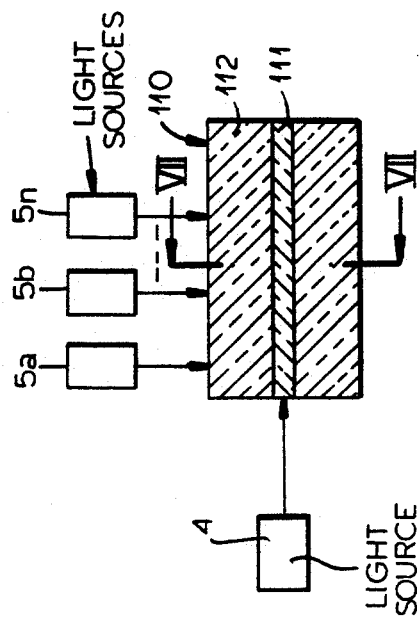
FIG.5
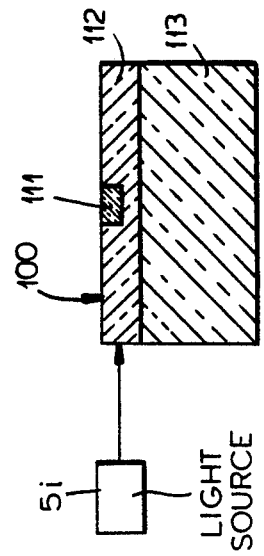
FIG.6
FIG.7
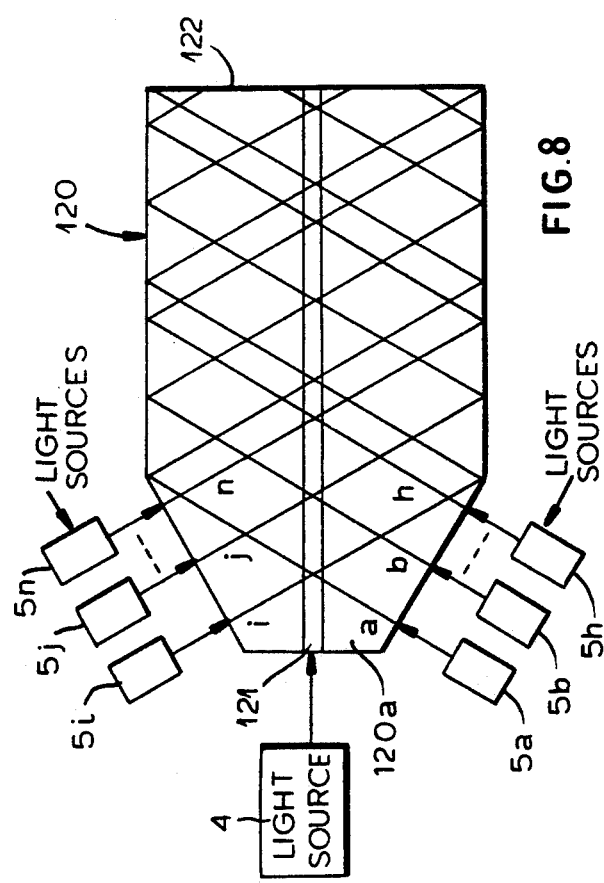
FIG.8

PUMP SYSTEM FOR WAVEGUIDE LASERS OR AMPLIFIERS

FIELD OF THE INVENTION

The present invention relate to active optical waveguide components and, more particularly, to a pump system for waveguide lasers or amplifiers.

BACKGROUND OF THE INVENTION

Optical waveguide lasers and amplifiers, whether made of a fiber or in integrated optics, are of particular interest since they are components which can be manufactured at a relatively low cost and with techniques now well consolidated, and which are capable of operating at several of the wavelengths important for present or future applications in fields such as telecommunications, medicine, spectroscopy, sensing and the like. Considering, in particular applications, in telecommunications, waveguide lasers and amplifiers can obviously be easily coupled to other waveguide components of an optical communication system, such as the fiber forming the transmission medium, directional couplers, and the like.

An optical waveguide laser or amplifier is usually formed of a length of a monomode active guide, obtained by using suitable dopand ions, e.g. rare earth ions, and an optical pump radiation is launched into said guide to supply the energy required to produce the so-called population inversion, possibly allowing stimulated emission which the amplification effect is based. In the case of a laser, the guide is clamped in position in a resonant structure which can be schematized by a pair of mirrors placed at the guide ends, and the pump radiation is launched into the guide through one of two mirrors. In the case of an amplifier, the guide conveys both the optical signal to be amplified and the pump radiation, which are launched by means of dichroic components or directional couplers having suitable coupling factors for the two wavelengths. Some embodiments of optical fiber lasers and amplifiers are described, e.g. in the article "Review of rare earth doped fibre lasers and amplifiers" by P. Urquhart, IEE Proceedings, Vol. 135, Part J, No. 6, December 1988.

Usually, the pump radiation is directly launched into the active guide region by using sources consisting for example of semiconductor lasers, which are available at the wavelengths of interest for the applications mentioned above. In the case of monomode guides, this can represent a severe limitation. In fact, for a given power of the pump radiation, the fiber length in which the pump effect is present, and hence the attainable gain, have a determined value which cannot be exceeded. To obtain higher gains, it would be necessary to use a plurality of separate sources. Yet, as is known, it is impossible to sum in a monomode guide the radiations emitted from a plurality of independent sources having the same wavelength and the same polarization, because this would be a violation of the conservation law of radiance, as described by P. Di Vita and R. Vannucci in the paper entitled 'The "Radiance Law" in Radiation Transfer Process', Applied Physics, No. 7 (1975), pages 249-255. Therefore, the maximum injectable power in a monomode guide will be that of two orthogonal polarization sources and the improvement obtainable is rather limited. The only alternative would be to use very powerful individual sources, but sources of this type are not available for all wavelength of interest.

OBJECT OF THE INVENTION

It is an object of the present invention to provide a pump system which allows overcoming the constraints imposed by the conservation law of radiance and which can be used at all wavelengths of interest.

SUMMARY OF THE INVENTION

The invention provides a method of pumping lasers and amplifiers made by a waveguide which presents an active monomode region, where at least a part of the pump radiation is launched into a multimode waveguide which surrounds the active guide region.

By launching the pump radiation, or part thereof, into a multimode guide, the power required for such a radiation can be obtained by summing radiation emitted by a plurality of independent sources with the same wavelengths and/or polarization, and hence sources can be used which otherwise would be inadequate due to the limited output power. In this way therefore many problems of availability of the sources of suitable wavelength can be overcome.

The present invention provides also an apparatus for carrying out the method.

BRIEF DESCRIPTION OF THE DRAWING

To make the invention clearer, reference is made to the annexed drawing in which:

FIG. 5 is a view of a further embodiment of the invention, relevant to the application to integrated optical guides;

FIG. 6,7 are a plan and a cross-sectional view, respectively, of a first variant of the pump system for integrated optical guides; and FIG. 8 is a plan view of another variant of the pump system for integrated optical guides.

SPECIFIC DESCRIPTION

Figure 1:
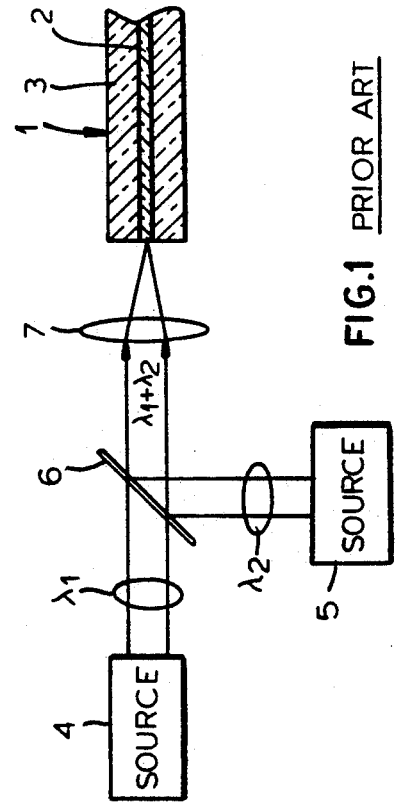
FIG. 1 is a schematic representation of a prior-art pump system for an optical fiber amplifier.

FIG. 1 shows an active monomode fiber 1 having a core 2, doped e.g. with rare earth ions, and a cladding 3. Two sources 4 and 5 send into two faces of a dichroic mirror 6 the signal to be amplified, at wavelength $\lambda 1$, and the pump radiation, at wavelength $\lambda 2$. The drawing assumes that mirror 6 is transparent to wavelength $\lambda 1$ and reflects wavelengths $\lambda 2$. The two beams leave mirror 6 from the same face and are focused by a lens 7 at the entrance of core 2 of fiber 1.

Figure 3:
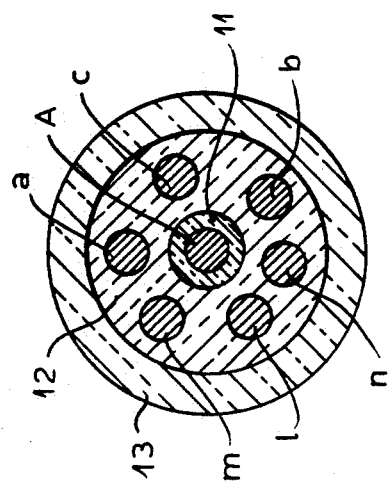
FIG. 3 is a cross-sectional view taken along line III—III in FIG. 2.
Figure 2:
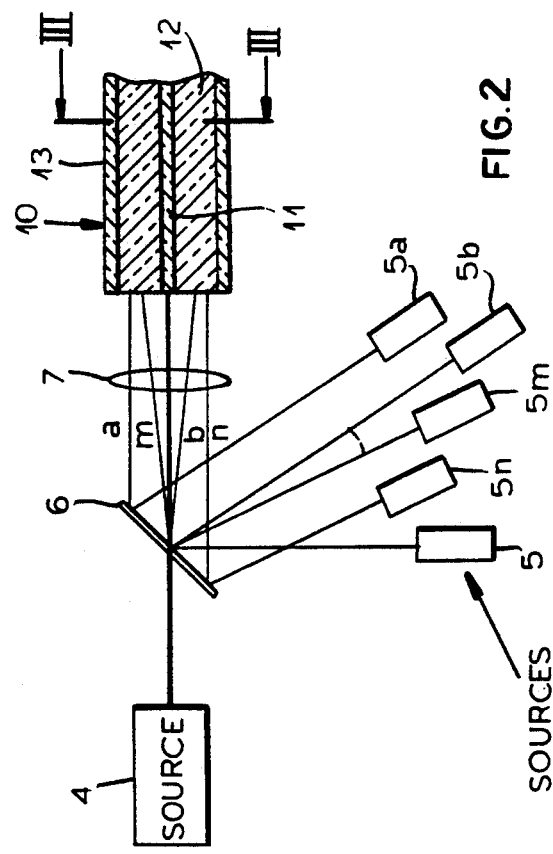
FIG. 2 is a view similar to that of FIG. 1, showing an embodiment of the invention.

FIG. 2 shows a pump system according to the invention. Identical elements in FIGS. 1 and 2 are denoted by the same reference numerals. For sake of clarity of the drawing, the different pump beams are shown with thin lines, and the signal to be amplified is indicated with a thicker line. A plurality of sources $5a, 5b \ldots 5m, 5n$ of pump radiations at wavelength $\lambda 2$ send the respective beams towards dichroic mirror 6 with such orientations that the radiations themselves are launched into cladding 12 of fiber 10. Cladding 12 is advantageously covered with a transparent layer 13 of lower refractive index. Sources 5a... 5n can be used in place of or in addition to source 5 which launches a pump radiation into the fiber core, as in the conventional technique. In FIG. 3, a,b,c,... l,m,n denote the beams emitted from corresponding pump radiation sources and coupled to cladding 12, and A denotes the beam emitted from source 4 of the signal to be amplified, coupled to core 11.

As is known, the optical fiber cladding does not present size constraints depending on the operating conditions of the structure and the whole of cladding 12 and transparent layer 13 of fiber 10 can form a multimode optical fiber which surrounds monomode core 11. Multimode fiber cladding 12 is not subjected to the constraints imposed by the radiance law and hence the signals emitted by independent sources 5a... 5n can be summed in such a fiber simply by coupling them to different points of cladding 12. Thanks to the presence of the external layer 13 of refractive index lower than that of cladding 12, radiations a... n are then absorbed by active core 11 of the fiber as they tend to pass to the region of higher refractive index, and they will exert the pump action together and jointly with source 5, if any, which launches into the core. Sources 5, 5a... 5n must then meet less stringent requirements in terms of radiance and power emitted for a predetermined pump level and, more particularly can be conventional semiconductor lasers, thereby increasing choice flexibility in terms of wavelength. The presence of a plurality of pump radiation sources allows achievement of a pump power much higher than that injectable into the single core of a monomode fiber by using sources of the same kind and hence, for given absorption characteristics of the fiber, the pump action is exerted on a longer fiber portion, thus allowing higher gains.

The efficiency with which the pump radiations are absorbed by core 11 determines the fiber length necessary to obtain a predetermined gain. To maximize such efficiency it is possible to act on the fiber arrangement, e.g. by adopting an arrangement facilitating power conversion between different order modes in cladding 12, so as to produce a progressive power transfer from the modes which are less absorbed by active core 11 to those which are more absorbed. This can be obtained by winding up the fiber onto a drum of suitable diameter or by making it follow a serpentine path.

Layer 13 could be dispensed within a fiber like fiber 1 of FIG. 1 is used in the open air, because the air would exert exactly the same functions as such a layer; yet, since in general the fibers having protective coatings which can be absorbent or have a refractive index higher than that of the cladding, it is preferred that layer 13 is present. On the other hand, layer 13 can be made during the same operations which result in the formation of core 11 and cladding 12 and hence its presence does not entail manufacturing problems.

Figure 4:
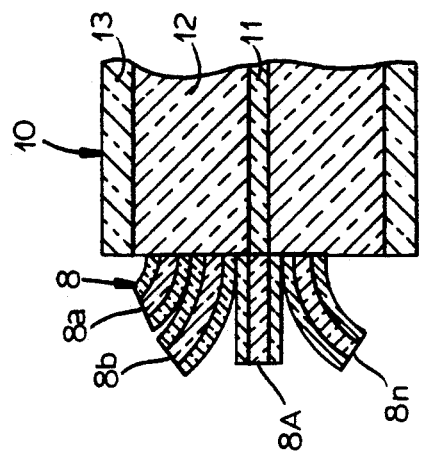
FIG. 4 is a partial view of another embodiment of the invention, always in applications to optical fibers.

FIG. 4 shows another embodiment of the invention in which couplers are used to send into the fiber the signal to be amplified and the pump radiations. In the practice, a multiple coupler 8 is used. Sources 5a... 5n send their radiations, e.g. through conventional (i.e. non active) fibers, into coupler branches 8a... 8n ending in front of cladding 12 of active fiber 10, while source 4 sends the signal to be amplified into a branch 8A which ends in front of core 11.

The invention can be applied also in case of integrated optical guides, as shown in FIG. 5 and 8. For the sake of simplicity a rectilinear guiding region has been shown, but what we will say will be valid for any geometry.

In FIG. 5, reference numerals 101, 102 denote the guiding region (active region) and the confinement region of an integrated optical waveguide 100 to be used as an amplifier; such regions correspond with the core and the cladding of fiber 10 (FIG. 2) respectively and are made on a transparent substrate or wafer 103, with refractive index lower than that of confinement region 102. Region 102 has such a size as to form a multimode guide with wafer 103. Source 4 send the signal to be amplified into active region 101 and sources 5a... 5n send the pump radiations into region 102. The means allowing the radiation transfer from the sources to guide 100 have not been shown, since they are well known to the skilled in the art.

The geometrical characteristics of the guide and the launching modalities of the pump radiation can be determined also in this case so as to obtain a predetermined gain for a given length of guide 100. E.g. in FIG. 5 the boundaries between region 102 and region 103 have a serpentine shape, to facilitate power transfer from region 102 to region 101, as in the case of an optical fiber amplifier.

In another solution (FIGS. 6,7) the confinement region 112 of waveguide 110 extends over the whole wafer surface which is not occupied by guiding region 111. The various pump radiation sources 5a, 5b... 5i.. . 5n are arranged in space relationship along a wafer side parallel to guiding region 111 and launch the respective radiations transversally to such region into confinement region 112. By this arrangement the guiding region absorbs a fraction of the pump radiations whenever it is crossed by one of them. It is to be noted that the relative thicknesses of regions 112 and 111 shown in the drawing are purely indicative and that region 111 could have a greater thickness than region 112 (if $\lambda 2 < \lambda 1$).

A further alternative which improves pumping efficiency is represented in FIG. 8. Guide 120 presents a substantially trapezoidal end zone 120a; all sources 5a.. . 5n are arranged in such a zone and send radiations a.. . n transversally to the two oblique sides of that region. Hence radiations a... n undergo multiple reflections by the surfaces bounding region 122 and cross the guiding region 121 many times yielding every time a fraction of their power.

It is clear that what has been described has been given only by way of non-limiting example and that variations and modifications are possible without departing from the scope of the invention. More particularly, source 5 which launches a beam into core 11 can be present in all embodiments. Besides, even though in the description reference has been made to an amplifier, the same principle can be applied to a waveguide layer.

We claim:

1. A method of operating and optical device which comprises the steps of:
   (a) flanking an elongated monomode light-conductive region of an optical device by a multimode optical waveguide; and
   (b) launching into said multimode optical waveguide from a multiplicity of locations spaced longitudinally along at least one side thereof and, from each of said locations in a direction generally transverse to said elongated monomode light-conductive region, a respective light beam from a respective source, thereby optically pumping said device with the light beams from all of said sources.

2. The method defined in claim 1, further comprising the step of launching into said elongated monomode light-conductive region at an end of said device and an end of said region, a light beam from a further source of a frequency different from a frequency of the light beams common to the sources launching light beams into said multimode optical waveguide at said locations.

3. The method defined in claim 2 wherein said multimode optical waveguide has a pair of longitudinal sides extending parallel to one another and to said elongated monomode region, said light beams for pumping said device being launched into said multimode optical waveguide perpendicular to one of said sides at said locations.

4. The method defined in claim 2 wherein said multimode optical waveguide has a pair of longitudinal sides extending parallel to one another and to said elongated monomode region and a pair of outwardly inclined sides extending from said end to said parallel sides, said light beams for pumping said device being launched into said multimode optical waveguide perpendicular to said outwardly inclined sides at said locations.

5. An optical device, comprising:
an elongated monomode light-transmissive region;
a multimode optical waveguide flanking said active region and in optical energy transferring relationship therewith, said multimode optical waveguide having sides extending longitudinally in spaced relationship with said elongated monomode light-transmissive region; and
a plurality of independent light sources, and respective means connected to each of said light sources for launching a respective light beam generated by the respective light source into said multimode optical waveguide transversely to said monomode at a plurality of locations spaced longitudinally along at least one of said sides, thereby optically pumping said device with the light beams from all of said sources.

6. The device defined in claim 5, further comprising means for launching into said elongated monomode light-conductive region at an end of said device and an end of said region, a light beam from a further source of a frequency different from a frequency of the light beams common to the source launching light beams into said multimode optical waveguide at said locations.

7. The device defined in claim 6 wherein said multimode optical waveguide has a pair of longitudinal sides extending parallel to one another and to said elongated monomode region, said light beams for pumping said device being launched into said multimode optical waveguide perpendicular to one of said sides at said locations.

8. The device defined in claim 6 wherein said multimode optical waveguide has a pair of longitudinal sides extending parallel to one another and to said elongated monomode region and a pair of outwardly inclined sides extending from said end to said parallel sides, said light beams for pumping said device being launched into said multimode optical waveguide perpendicular to said outwardly inclined sides at said locations.

* * * * *